United States Patent
Shen

(10) Patent No.: US 12,482,299 B2
(45) Date of Patent: Nov. 25, 2025

(54) IMAGE RECOGNITION METHOD AND APPARATUS, COMPUTING DEVICE, AND COMPUTER-READABLE STORAGE MEDIUM

(71) Applicant: Tencent Technology (Shenzhen) Company Limited, Shenzhen (CN)

(72) Inventor: Wei Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 431 days.

(21) Appl. No.: 17/973,413

(22) Filed: Oct. 25, 2022

(65) Prior Publication Data

US 2023/0041233 A1 Feb. 9, 2023

Related U.S. Application Data

(63) Continuation of application No. PCT/CN2021/119210, filed on Sep. 18, 2021.

(30) Foreign Application Priority Data

Oct. 9, 2020 (CN) .......................... 202011070422.8

(51) Int. Cl.
G06V 40/40 (2022.01)
G06V 10/774 (2022.01)
G06V 10/82 (2022.01)
G06V 40/16 (2022.01)

(52) U.S. Cl.
CPC ............ *G06V 40/40* (2022.01); *G06V 10/774* (2022.01); *G06V 10/82* (2022.01); *G06V 40/172* (2022.01)

(58) Field of Classification Search
CPC ... G06F 18/214; G06F 18/241; G06V 10/774; G06V 10/82; G06V 40/172; G06V 40/40; Y02T 10/40
See application file for complete search history.

(56) References Cited

U.S. PATENT DOCUMENTS 10,713,821 B1 * 7/2020 Surya .................... G06N 3/045
2019/0130110 A1   5/2019 Lee et al.
2021/0227152 A1 * 7/2021 Zhang .................... G06V 10/82

FOREIGN PATENT DOCUMENTS

CN   107463953 A   12/2017
CN   110458185 A   11/2019
(Continued)

OTHER PUBLICATIONS

A machine translated English version of document CN110458185 (Year: 2019).*

(Continued)

*Primary Examiner* — Ruiping Li
(74) *Attorney, Agent, or Firm* — Morgan, Lewis & Bockius LLP

(57) ABSTRACT

An image recognition method includes: obtaining a to-be-recognized image; determining whether the image is a forged image by recognizing the image through a trained generative adversarial network, the generative adversarial network including a generator and a classifier. Training the classifier includes: obtaining an original image group having a plurality of original images, and a category label of each original image. Each of the plurality of original images includes a real image and a forged image corresponding to the real image. The method includes obtaining using the classifier, for a respective original image of the plurality of original images, first-type noise corresponding to the respective original image; inputting the respective original image into the generator to obtain an output of the generator, and obtaining second-type noise corresponding to the respective original image as the output; and training the classifier using the respective original image, the first-type noise, and the second-type noise.

20 Claims, 12 Drawing Sheets

(56) References Cited

FOREIGN PATENT DOCUMENTS

| CN | 110728629 A | 1/2020 |
|----|-------------|--------|
| CN | 111159454 A | 5/2020 |
| CN | 111353392 A | 6/2020 |
| CN | 111414928 A | 7/2020 |
| CN | 111475797 A | 7/2020 |
| CN | 111737952 A | 10/2020 |
| CN | 112149608 A | 12/2020 |
| WO | WO 2019210303 A1 | 10/2019 |
| WO | WO 2019222401 A3 | 1/2020 |

OTHER PUBLICATIONS

Nirkin et al., "FSGAN: Subject Agnostic Face Swapping and Reenactment", 2019 (Year: 2019).*

Tencent Technology, Isr, PCT/CN2021/119210, Oct. 25, 2021, 3 pgs.

Tencent Technology, WO, PCT/CN2021/119210, Dec. 14, 2021, 5 pgs.

Tencent Technology, IPRP, PCT/CN2021/119210, Mar. 28, 2023, 6 pgs.

Tencent Technology, Extended European Search Report, EP Patent Application No. 21876932.1, Jan. 9, 2024, 12 pgs.

Zhaoqing Pan et al., "Recent Progress on Generative Adversarial Networks (GANs): A Survey", IEEE Access, vol. 7, DOI: 10.1109/ACCESS.2019.2905015, Mar. 14, 2019, 12 pgs.

Tencent Technology, European Office Action, EP Patent Application No. 21876932.1, Oct. 21, 2025, 6 pgs.

Paarth Neekhara et al., "Adversarial Deepfakes: Evaluating Vulnerability of Deepfake Detectors to Adversarial Examples", Proceedings of the IEEE/CVF Winter Conference on Applications of Computer Vision (WACV), Mar. 2020, 11 pgs.

* cited by examiner

IMAGE RECOGNITION METHOD AND APPARATUS, COMPUTING DEVICE, AND COMPUTER-READABLE STORAGE MEDIUM

CROSS-REFERENCE TO RELATED APPLICATIONS

This application is a continuation application of PCT Patent Application No. PCT/CN2021/119210, entitled "IMAGE RECOGNITION METHOD AND APPARATUS, COMPUTING DEVICE AND COMPUTER-READABLE STORAGE MEDIUM" filed on Sep. 18, 2021, which claims priority to Chinese Patent Application No. 202011070422.8, filed with the State Intellectual Property Office of the People's Republic of China on Oct. 9, 2020, and entitled "IMAGE RECOGNITION METHOD AND APPARATUS, COMPUTING DEVICE, AND COMPUTER-READABLE STORAGE MEDIUM", all of which are incorporated herein by reference in their entirety.

FIELD OF THE TECHNOLOGY

This application relates to the field of image recognition processing, and in particular, to an image recognition method and apparatus, a computing device, and a computer-readable storage medium.

BACKGROUND OF THE DISCLOSURE

Face-swapping recognition is a technology based on an image algorithm and visual artificial intelligence (AI), which detects and analyzes face authenticity in the video, and determines whether the face in the video or picture is a fake face generated by using an AI face-swapping algorithm. The existing face-swapping recognition model is a conventional convolutional neural network, which is usually a model pre-trained on a natural image and then fine-tuned on a dataset formed by a face-swapping image and a normal face image.

SUMMARY

The present disclosure provides an image recognition method and apparatus, a computing device, and a computer-readable storage medium, which can fully consider diversity of adversarial noise, to improve accuracy and a recall rate of image recognition, and resolve a problem of model overfitting.

According to an aspect of this application, an image recognition method is provided, applicable to a computing device, the method including:
  obtaining a to-be-recognized image;
  determining whether the to-be-recognized image is a forged image by recognizing the to-be-recognized image through a trained generative adversarial network, wherein the generative adversarial network includes a generator and a classifier; and
  training the classifier including:
    obtaining an original image group including a plurality of original images and a category label of each original image, each of the plurality of original images including a real image and a forged image corresponding to the real image;
    obtaining using the classifier, for a respective original image in the plurality of original images, first-type noise corresponding to the respective original image;
    inputting the respective original image into the generator to obtain second-type noise corresponding to the respective original image as an output of the generator; and
    training the classifier using the respective original image, the first-type noise, and the second-type noise.

According to an aspect of this application, an image recognition apparatus is provided, applicable to a computing device, the apparatus including:
  an obtaining module, configured to obtain a to-be-recognized image; and
  a recognition module, configured to recognize the to-be-recognized image through a trained generative adversarial network, to determine whether the to-be-recognized image is a forged image,
  the generative adversarial network including a generator and a classifier; and training the classifier including:
    obtaining an original image group including a plurality of original images and a category label of each original image, each of the plurality of original images including a real image and a forged image corresponding to the real image;
    obtaining using the classifier, for respective original image in the plurality of original images, first-type noise corresponding to the respective original image;
    inputting the respective original image into the generator to obtain second-type noise corresponding to the respective original image as an output of the generator; and
    training the classifier using the respective original image, the first-type noise, and the second-type noise.

According to an aspect of this application, a computing device is provided, including a memory and a processor, the memory being configured to store computer-executable instructions, the computer-executable instructions, when executed on the processor, performing the image recognition method.

According to an aspect of this application, a computer-readable storage medium is provided, storing computer-readable instructions, the computer-readable instructions, when executed on a processor, performing the image recognition method.

BRIEF DESCRIPTION OF THE DRAWINGS

More details, features, and advantages of this application are disclosed in the following description of exemplary embodiments with reference to accompanying drawings. The accompanying drawings are merely used for illustrating the implementations and are not intended to constitute a limitation on the present disclosure. Throughout the accompanying drawings, the same or similar elements are denoted by the same reference numerals. In the accompanying drawings.

DESCRIPTION OF EMBODIMENTS

Figure 1A:
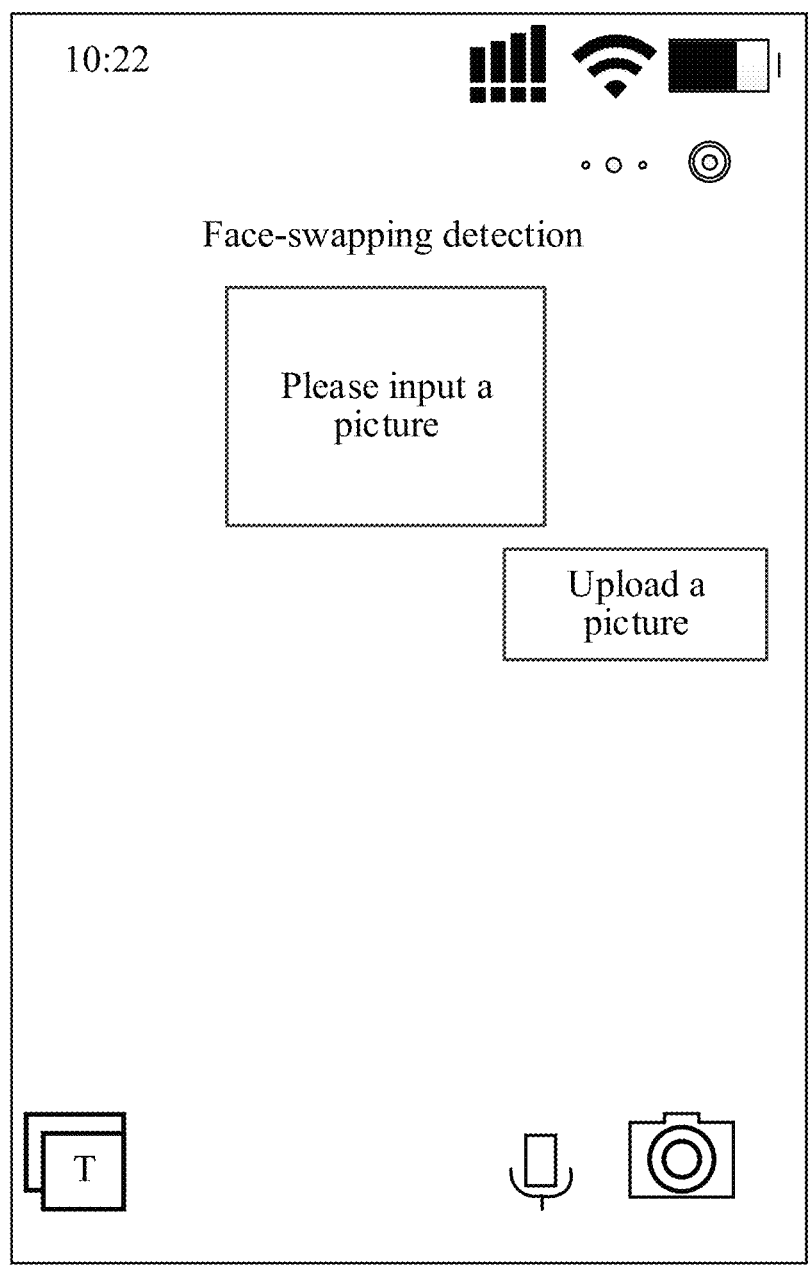
FIG. 1A schematically shows a user interface according to an embodiment of this application.

The following describes the embodiments of this application in detail with reference to the accompanying drawings, so that a person skilled in the art can understand and implement this application. However, this application may be implemented in many different forms and should not be construed as being limited to the embodiments set forth herein. Conversely, the embodiments are provided to make this application comprehensive and complete, and fully convey the scope of this application to a person skilled in the art. The embodiments are used for illustration but are not intended to limit this application.

It is to be understood that, although terms such as "first", "second", and "third" in this specification may be used for describing various elements, steps and/or parts, such elements, steps and/or parts are not to be limited by the terms. The terms are merely used for distinguishing one element, step or part from another element, step or part. Therefore, the "first element, step or part", described below may also be referred to as a "second element, step or part" without departing from the teachings of this application.

The terms used herein are for the purpose of describing specific embodiments only and are not intended to limit this application. For example, as used herein, singular forms "a", "an" and "the" are intended to include plural forms, unless the context clearly indicates otherwise. It may be further understood that, the terms such as "comprising" and/or "including", when used in this specification, indicates the existence of the described features, unities, steps, operations, elements and/or components, but do not exclude the existence of one or more other features, unities, steps, operations, elements, components and/or parts. As used herein, the term "and/or" includes any and all combinations of one or more of the associated listed items.

Unless otherwise defined, all terms (including technical and scientific terms) used herein have the same meaning as commonly understood by one of ordinary skill in the art to which this application belongs. It may be further understood that the terms such as those defined in commonly used dictionaries should be interpreted as having a meaning that is consistent with meaning in the context of the relevant art and/or this specification and may not be interpreted in an idealized or overly formal sense, unless the terms are clearly defined herein.

The features in different embodiments may be combined in case of no conflicts.

Before the embodiments of this application are described in detail, certain related concepts are explained first below:

(1) Generative adversarial network (GAN): The generative adversarial network causes two neural networks to contest with each other for learning. The generative adversarial network includes a generative network (which may also be referred to as a generator) and a discriminative network (which may also be referred to as a classifier). The generative network randomly samples from a latent space and uses a sample as an input, and an output result needs to imitate a real sample in a training set as much as possible. An input of the discriminative network is an output of the generative network, which aims to distinguish the output of the generative network from the real sample, and the generative network needs to deceive the discriminative network as much as possible. The two networks confront each other and parameters are continuously adjusted. A final objective is to make it impossible for the discriminative network to determine whether the output result of the generative network is real.

(2) Fast adversarial noise: One way to generate adversarial noise is to input an original image (for example, a real image) into the discriminative network, change a category label of the original image, and then back propagate gradient information obtained based on a classification loss function to the original image. The gradient information obtained by the real image is used as the adversarial noise. Since the adversarial noise can be obtained by performing back propagation only once, the adversarial noise is referred to as the fast adversarial noise (which is also referred to as first-type noise herein).

(3) Slow adversarial noise: It is adversarial noise that generates the original image through the generative adversarial network. The generative adversarial network includes two networks, namely, a generative network and a discriminative network. The discriminative network is a binary classification network (which is expressed as a classifier herein), and is responsible for determining whether an input image is a real image or a generative image, and minimizing a classification loss function of the discriminative network. The generative network generates a picture with a given input and maximizes the classification loss function of the discriminative network. Since the generative network continuously receives supervision information from the discriminative network to optimize parameters, which requires a long training process, the generative network is referred to as the slow adversarial noise (which is referred to as second-type noise herein).

In some embodiments, a face-swapping recognition model may train face-swapping data based on a classification model, However, model overfitting may occur due to limited face-swapping data, resulting in poor generalization performance. During training of the classification model, the model is trained by using one of the fast adversarial noise or the slow adversarial noise. In such a manner, diversity of the adversarial noise is ignored. In view of this, it is not an efficient way to train a classification model with high accuracy and recall. An embodiment of this application provides an image recognition solution, so that the classifier may obtain richer training samples by constructing fast adversarial noise and slow adversarial noise for the classifier in the generative adversarial network, thereby improving the performance of the classifier. Since the generative adversarial network is trained by using the fast adversarial noise and the slow adversarial noise, the diversity of the adversarial noise is fully considered in this embodiment of this application, so that the accuracy and the recall rate of image recognition may be improved, and the problem of model overfitting may be resolved.

The image recognition solution provided in this embodiment of this application may be applied to a scenario such as face-swapping detection. The application scenario may include, for example, the following scenarios: (1) Combating industries such as pornography. In recent years, the number of deeply forged videos on the Internet has increased dramatically, and most of such videos are related to pornographic content. The forged videos have a large number of views. Such forged videos may be recognized by performing face-swapping detection, thereby reducing propagation of pornography content with a forged face. (2) Combating propagation of fake videos online. In the era of Deepfake prevalence, combination of fake videos, fake news, and social networks has aggravated dissemination of online rumors, making it difficult to distinguish authenticity. As a result, people may be forced to bear a fabricated charge, and what people have really said and done may become an illusion. A forged video face existed in an online video may be recognized by performing face-swapping detection, thereby preventing falsification and restoring the truth. (3) Combating cyber fraud. The popularity of certain entertaining face-swapping applications has caused people to worry about the security of personal information such as facial information. When existing means of fraud are combined with AI face-swapping, the number of deceived people can surge exponentially. Forged videos in network service handling may be recognized by performing face-swapping detection, thereby reducing cyber fraud.

Figure 1B:
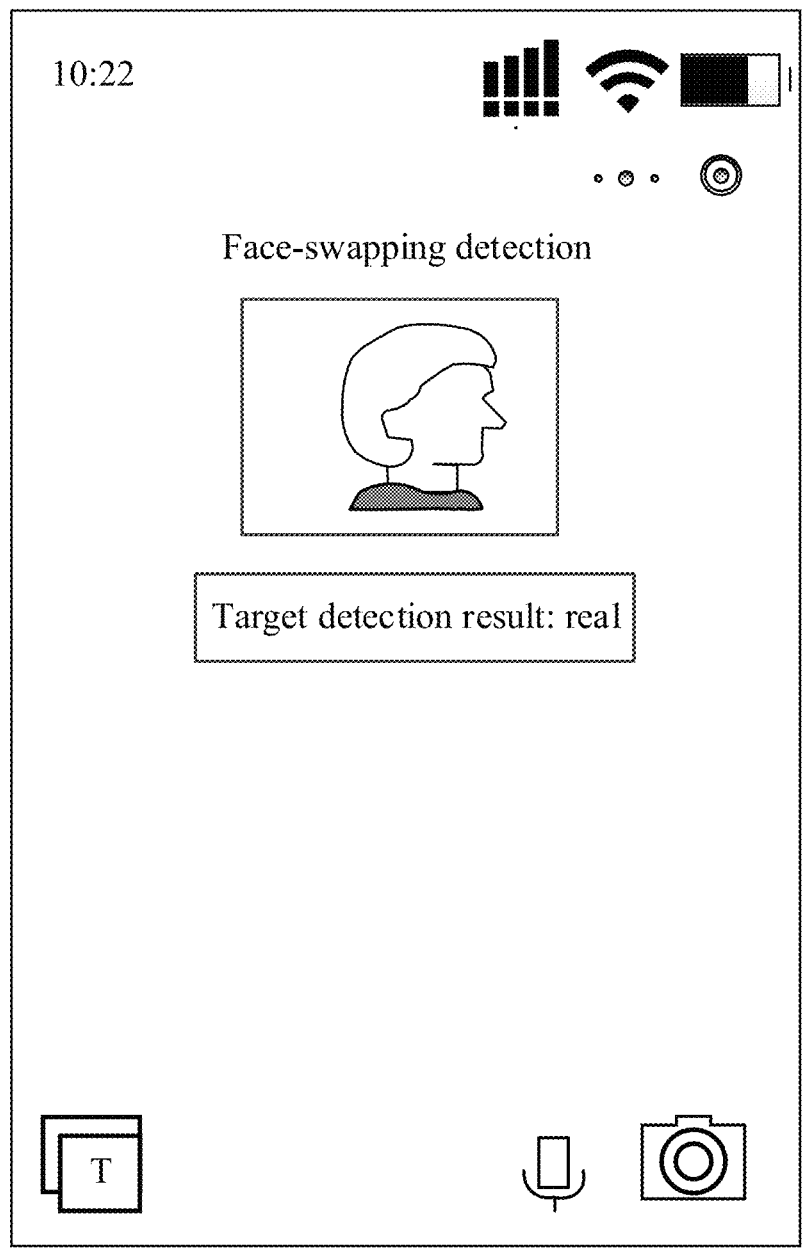
FIG. 1B schematically shows a user interface according to another embodiment of this application.

FIG. 1A and FIG. 1B schematically show user interfaces of face-swapping detection according to an embodiment of this application. In the user interface of face-swapping detection shown in FIG. 1A, a user may upload a to-be-recognized image, and the to-be-recognized image may be detected by a user terminal-side computing device or a server-side computing device. The to-be-recognized image uploaded may be a single image, or may be an image an image with a face selected from a to-be-detected video. After detection and analysis, a result (for example, FIG. 1B shows a detection result of a real image) is displayed through the interface shown in FIG. 1B.

In addition, as understood by a person skilled in the art, a face-swapping detection result may also be provided in the form of an application programming interface (API). By using a user call face-swapping detection API, a to-be-detected image (which may be an image from a video) may be uploaded through a command line, the image is presented the detection result in the form of the command line after computation at the server or the user terminal. For example, a returned result of 1 indicates that the face is real; and a returned result of 0 indicates that the face is a synthetic fake face.

Figure 2:
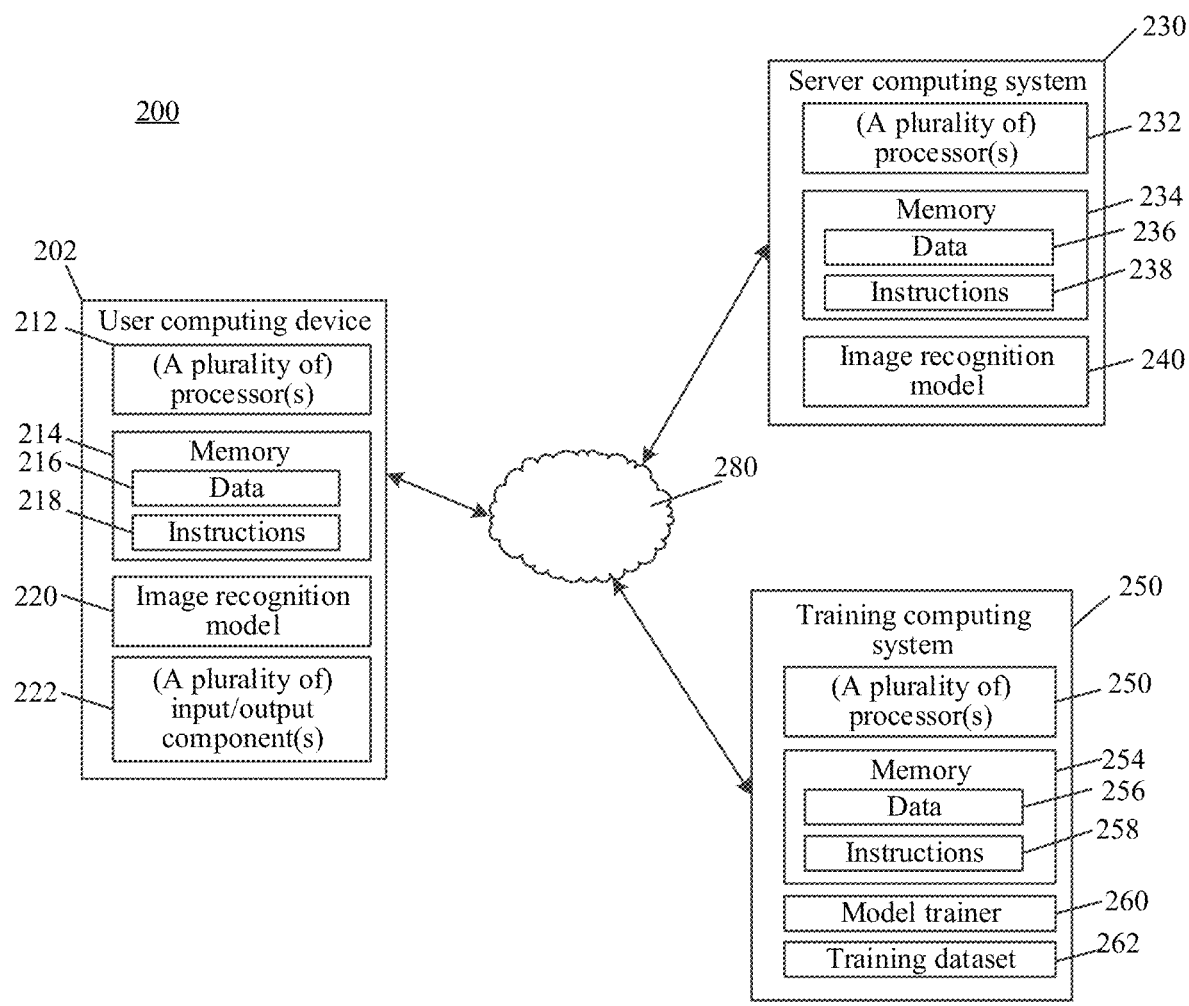
FIG. 2 schematically shows an exemplary scenario that can be applied to some embodiments of this application.

FIG. 2 shows a block diagram of an exemplary computing system 200 according to an exemplary embodiment of this application. The system 200 includes a user computing device 202, a server computing system 230, and a training computing system 250 communicatively coupled through a network 280.

The user computing device 202 may be any type of computing device such as a personal computing device (for example, a laptop or desktop computing device), a mobile computing device (for example, a smartphone or a tablet computer), a game console or controller, a wearable computing device, or an embedded computing device.

The user computing device 202 includes one or more processors 212 and a memory 214. The one or more processors 212 may be any suitable processing device (for example, a processor core, a microprocessor, an ASIC, an FPGA, a controller, a microcontroller, and the like), or may be a processor or a plurality of processors operably connected. The memory 214 may include one or more non-transitory computer-readable storage media, such as a RAM, a ROM, an EEPROM, an EPROM, a flash device, a disk, and a combination thereof. The memory 214 may store data 216 and instructions 218 executed by the processor 212, to cause the user computing device 202 to perform operations.

The user computing device 202 may store or include one or more image recognition models 220. For example, the image recognition model 220 may be or may otherwise include various machine learning models, such as a neural network (for example, a deep neural network) or another multilayer nonlinear model. The neural network may include a generative adversarial network, a recurrent neural network (for example, a long short-term memory recurrent neural network), a feedforward neural network, a convolutional neural network, or a neural network in another form. Alternatively or additionally, the image recognition model 220 may include a machine learning model in another form.

In some implementations, one or more image recognition models 220 may be received from the server computing system 230 through the network 280 and stored in the memory 214 of user computing device, and then are used by the one or more processors 212 or implemented in another manner. In some implementations, the user computing device 202 may implement a plurality of parallel instances of the image recognition model 220 (for example, execute a plurality of parallel instances of image recognition).

Additionally or alternatively, one or more image recognition models 240 may be included in the server computing system 230 that communicates with the user computing device 202 in accordance with a client-server relationship, or may be stored and implemented by the server computing system 230 in another manner. For example, the image recognition model 240 may be implemented by the server computing system 230 as part of network services (for example, an image feature search service). Therefore, the one or more image recognition models 220 may be stored and implemented at the user computing device 202, and/or the one or more image recognition models 240 may be stored and implemented at the server computing system 230.

The user computing device 202 may also include one or more user input components 222 that receive a user input. For example, the user input component 222 may be a touch-sensitive component (for example, a touch-sensitive display screen or a touchpad) that is touch-sensitive to a user input object (for example, a finger or a stylus). The touch-sensitive component may be configured to implement a virtual keyboard. Other exemplary user input components include a microphone, a conventional keyboard, a conventional mouse, a camera, or another component to which the user can provide a user input.

The server computing system 230 includes one or more processors 232 and a memory 234. The one or more processors 232 may be any suitable processing device (for example, a processor core, a microprocessor, an ASIC, an FPGA, a controller, a microcontroller, and the like), or may be a processor or a plurality of processors operably connected. The memory 234 may include one or more non-transitory computer-readable storage media, such as a RAM, a ROM, an EEPROM, an EPROM, a flash device, a disk, and a combination thereof. The memory 234 may store data 236 and instructions 238 executed by the processor 232, to cause the server computing system 230 to perform operations.

In some implementations, the server computing system 230 includes one or more server computing devices or is otherwise implemented by one or more server computing devices. In some embodiments, the server computing system 230 includes a plurality of server computing devices, such server computing devices operate according to a sequential computing architecture, a parallel computing architecture, or some combination thereof.

As described above, the server computing system 230 may store or otherwise include one or more machine-learned image recognition models 240. For example, the image recognition model 240 may be similar to the foregoing image recognition model 220.

The server computing system 230 may train the image recognition model 240 through interaction with the training computing system 250 communicatively coupled through the network 280. The training computing system 250 may be separate from the server computing system 230, or may be part of the server computing system 230.

The training computing system 250 includes one or more processors 252 and a memory 254. The one or more processors 252 may be any suitable processing device (for example, a processor core, a microprocessor, an ASIC, an FPGA, a controller, a microcontroller, and the like), or may be a processor or a plurality of processors operably connected. The memory 254 may include one or more non-transitory computer-readable storage media, such as a RAM, a ROM, an EEPROM, an EPROM, a flash device, a disk, and a combination thereof. The memory 254 may store data 256 and instructions 258 executed by the processor 252, to cause the training computing system 250 to perform operations. In some implementations, the training computing system 250 includes one or more server computing devices or is otherwise implemented by one or more server computing devices.

The training computing system 250 may include a model trainer 260. The model trainer 260 trains image recognition model 220/240 by using various training or learning technologies (for example, back propagation of an error). The model trainer 260 may perform a plurality of generalization techniques (for example, weight decay or loss) to improve generalization capability of a trained model.

Specifically, the model trainer 260 may train the image recognition model 220/240 based on a training data set 262.

The model trainer 260 includes computer logic for providing expected functions. The model trainer 260 may be implemented by using hardware, firmware, and/or software that controls a general-purpose processor. For example, in some implementations, the model trainer 260 includes a program file stored on a storage device, loaded into a memory, and executed by one or more processors. In other implementations, the model trainer 260 includes one or more sets of computer-executable instructions stored in a tangible computer-readable storage medium, such as a RAM hard disk or an optical or magnetic medium.

The network 280 may be any type of communication network, such as a local area network (e.g., an intranet), a wide area network (e.g., the Internet), or some combinations thereof, and may include any quantity of wired or wireless links. Generally, communication through the network 280 may be performed by using various communication protocols (e.g., TCP/IP, HTTP, SMTP, FTP), encodings or formats (e.g., HTML, XML), and/or protection schemes (e.g., VPN, secure HTTP, SSL) via any type of wired and/or wireless connection.

FIG. 2 shows an exemplary computing system that may be configured to implement an embodiment of this application. Alternatively, another computing system may also be used. For example, in some implementations, the user computing device 202 may include a model trainer 260 and a training data set 262. In such implementations, the image recognition model 220 may be trained and used locally at the user computing device 202. In some of such implementations, the user computing device 202 may implement the model trainer 260 to personalize the image recognition model 220 based on user-specific data.

Figure 3:
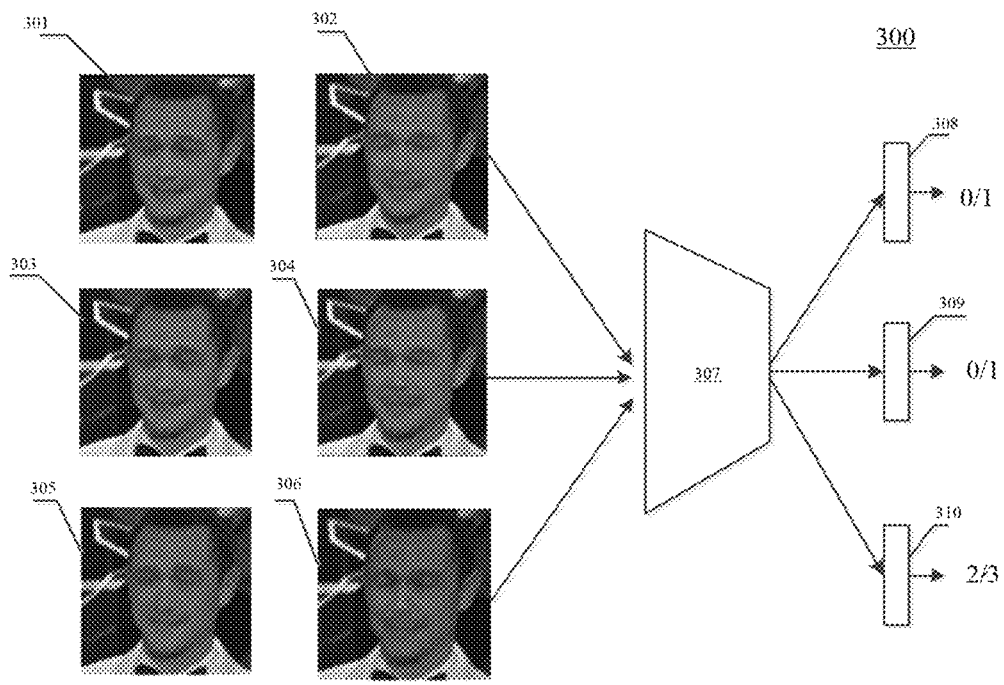
FIG. 3 schematically shows an architecture of a method for training an image recognition network according to an embodiment of this application.

FIG. 3 schematically shows an architecture 300 of a method for training an image recognition network according to an embodiment of this application. The image recognition network is a generative adversarial network. For a set of a real face image 301 (which may also be referred to as a real image) and a face-swapping face image 302 (which may also be referred to as a forged image), other two sets of images may be generated, where one set includes images (303, 304) that superimpose the original image and an image of the fast adversarial noise, and the other set includes images (305, 306) that superimpose the original image and an image of the slow adversarial noise. In this way, there are three sets of images. The three sets of images are all inputted into a classifier 307. For the first two sets of images, the classifier 307 is expected to classify the real face image 301/the image 303 that superimposes a real face and the fast adversarial noise into a category of 0, and classify the face-swapping face image 302/the image 304 that superimposes a face-swapping face and the fast adversarial noise into a category of 1, which is referred to labels 308 and 309. For the third set of images, the classifier 307 is expected to classify the image 305 that superimposes the real face image 301 and the slow adversarial noise into a category of 2, and classify the image 306 that superimposes the face-swapping face image 302 and the slow adversarial noise into a category of 3, which is referred to a label 310. A specific process of generating the fast adversarial noise and the slow adversarial noise is described in detail in FIG. 4 and FIG. 5 below.

Specific training steps are as follows: (1) Input an original image group into a classifier, to obtain a classification loss function L1. The classification loss function L1 may be selected as a cross-entropy function. (2) Exchange category labels of a real image and a forged image in the original image group, and back propagate gradient information to obtain fast adversarial noise. (3) Superimpose the fast adversarial noise and an original image, a superimposition weight being a, a being a random value between 0 and 1, input a superimposition result into the classifier, construct a classification loss function L2 by using a category label corresponding to the original image. The classification loss function L2 may be selected as a cross-entropy function. (4) Input the original image into a generator to obtain slow adversarial noise. The obtained slow adversarial noise and the original image are superimposed, a superimposition weight $\beta$, $\beta$ being a random value between 0 and 1, and then inputted into the classifier. In this case, a category label of an image obtained by superimposing the slow adversarial noise and the original image is ⅔, and a classification loss function L3 is constructed. The classification loss function L3 may be a cross-entropy function. (5) Sum L1, L2, L3 as a total classification loss function for the training classifier. (6) Replace the category label of the image obtained by superimposing the slow adversarial noise and the original image in step (4) with 0/1, input the image obtained by superimposing the slow adversarial noise and the original image into the generator to obtain corresponding gradient information, and train the generator by back propagating the gradient information.

Figure 4:
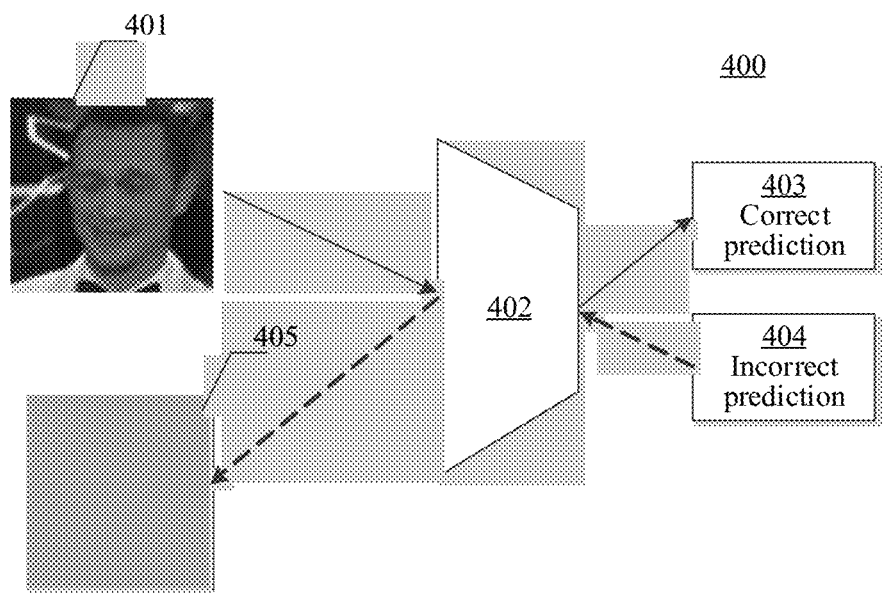
FIG. 4 schematically shows a fast adversarial noise generation method according to an embodiment of this application.

FIG. 4 schematically shows a fast adversarial noise generation method 400 according to an embodiment of this application. Any original image 401 (in an embodiment, a real image or a forged image in the original image may be selected) is given and inputted into a classifier 402, and a category label of the original image inputted is inverted, that is, a category label 1 of the real image is changed to a category label 0, and a category label 0 of the forged image is changed to a category label 1. 403 in FIG. 4 represents prediction when an initial category label is used, which is correct prediction. 404 in FIG. 4 represents prediction after inversion of the category label of the original image, which is incorrect prediction. A classification loss function is constructed by using an inverted category label, and gradient information is back propagated to the original image to obtain fast adversarial noise. The fast adversarial noise obtained by back propagating the gradient information has a smaller amplitude. Therefore, a category label of a noise-added image obtained by combining the original image and the fast adversarial noise remains unchanged. For example, the real image in the original image group has a first label, and the forged image in the original image group has a second label. Based on the above, a real noise-added image obtained by superimposing the real image and the fast adversarial noise also has the first label, and a forged noise-added image obtained by superimposing the forged image and the fast adversarial noise also has the second label.

Figure 5:
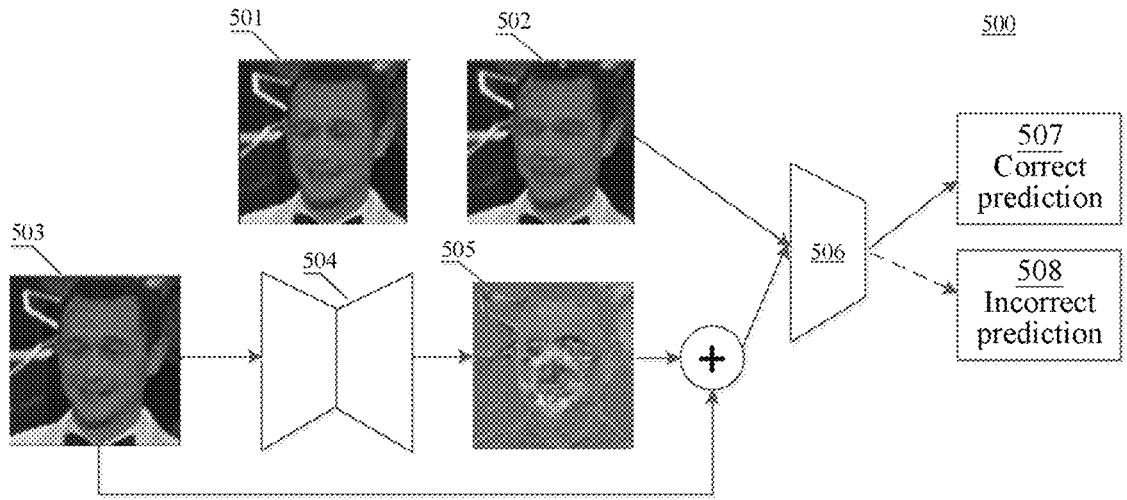
FIG. 5 schematically shows a slow adversarial noise generation method according to an embodiment of this application.

FIG. 5 schematically shows a slow adversarial noise generation method 500 according to an embodiment of this application. The procedure includes that a generative network 504 is responsible for generating slow adversarial noise 505. A manner of training the generative network 504 includes two steps. In the first step, the slow adversarial noise 505 and an original image 503 are superimposed and inputted into a classifier 506 together with a real image 501 and a forged image 502 in the original image. In this case, a category label of such samples is ⅔ (that is, correct prediction 507), and the classifier 506 is trained after the classification loss function is constructed. In the second step, the slow adversarial noise 505 and the original image 503 are inputted into the classifier 506 after superimposition. In this case, the category label of such samples is changed to 0/1 (that is, incorrect prediction 508). In other words, a category label corresponding to a result of superimposing the real image in the original image 503 and corresponding slow adversarial noise 505 is changed from 2 (that is, a third label) to 0 (that is, a first label), and a category label corresponding to a result of superimposing the forged image in the original image 503 and corresponding slow adversarial noise 505 is changed from 3 (that is, a fourth label) to 1 (that is, a second label). Based on this, after the classification loss function is constructed, gradient information is obtained through calculation, and the gradient information is back propagated, to train the generative network 504.

Figure 6:
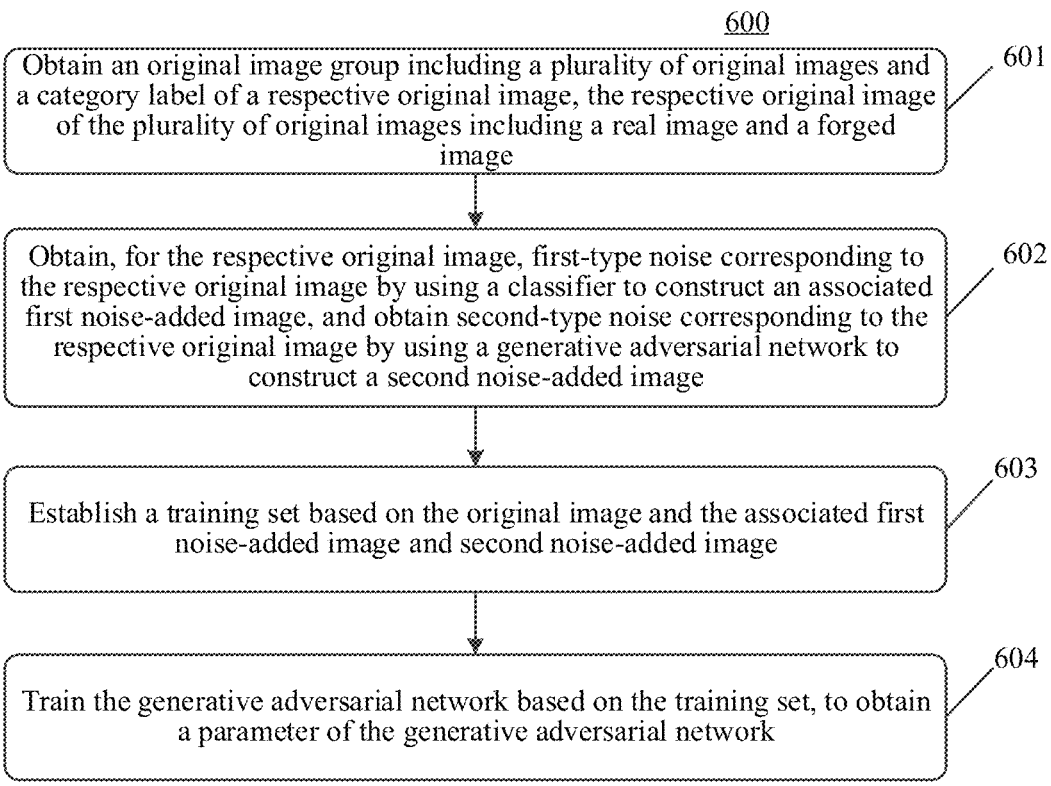
FIG. 6 schematically shows a flowchart of a method for training a neural network for image recognition according to an embodiment of this application.

FIG. 6 schematically shows a schematic diagram of a method 600 for training a neural network for image recognition according to an embodiment of this application. The neural network is a generative adversarial network, including a generator and a classifier, where the generator may be of an encoder-decoder structure, and the classifier is of a structure such as a DNN, a CNN, and the like. As understood by a person skilled in the art, the structures of the generator and the classifier are not limited to the foregoing examples, but may also include any other common neural network structure suitable for the method. The method may be performed by a user terminal-side computing device or a server-side computing device.

In step 601, an original image group including a plurality of original images and a category label of each original image are obtained, each of the plurality of original images including a real image and a forged image corresponding the real image. For example, the real image is an image with a face of a person A, and the forged image is, for example, an image forged by replacing the face of the person A in the real image with a face of a person B. In an example, there may be 80,000 original images, that is, there are 40,000 pairs of real images and forged images.

In step 602, for each original image, first-type noise corresponding to the respective original image is obtained by using a classifier to construct an associated first noise-added image, and second-type noise corresponding to the respective original image is obtained by using a generative adversarial network to construct a second noise-added image.

In an embodiment, the obtaining first-type noise corresponding to the respective original image by using a classifier includes: inverting a category label of the respective original image, to obtain an inverted label of the respective original image; inputting an original image including an inverted label into the classifier, and calculating gradient information by using a classification loss function; back propagating the gradient information to the respective original image, to obtain the first-type noise. Since the first-type noise can be obtained by performing back propagation only once, the first-type noise may also be referred to as fast adversarial noise.

In an embodiment, the inverting a category label of the respective original image includes: inverting a correspondence between the original image and the category label from that the real image corresponds to the first label and the forged image corresponds to the second label to that the real image corresponds to the second label and the forged image corresponds to the first label. As understood by a person skilled in the art, a function of the inverted label is to obtain noise information that is adversarial to the original image.

In an embodiment, the obtaining second-type noise corresponding to the respective original image by using a generative adversarial network includes: first training the generator by performing the following steps: superimposing the real image and noise outputted by the generator to generate a noised-added real image, and superimposing the forged image and the noise outputted by the generator to generate a noised-added forged image; training the classifier by using a real image having the first label, a forged image having the second label, a noised-added real image having the third label, and a noised-added forged image having the fourth label as training images; inputting a noised-added real image having the first label and a noised-added forged image having the second label into the trained classifier, and calculating gradient information by using a corresponding classification loss function; back propagating the gradient information to train the generator; and using an output of the trained generator as the second-type noise after the generator is trained. Since the generator continuously receives supervision information from the classifier to optimize parameters, which requires a relatively long training process, the second-type noise is also referred to as slow adversarial noise.

In another embodiment, the second-type noise may be generated by inputting in another manner. Such an implementation utilizes the feature that the first-type noise (that is, the fast adversarial noise) has a smaller amplitude, and an image type of a superimposed image obtained by superimposing the original image and the first-type noise is consistent with the original image. The obtaining second-type noise corresponding to the respective original image by using a generative adversarial network includes: randomly initializing the generator and the second-type noise; superimposing the real image, the first-type noise, and the second-type noise outputted by the generator to generate a noised-added real image, and superimposing the forged image, the first-type noise, and the second-type noise outputted by the generator to generate a noised-added forged image; training the classifier by using a real image having the first label, a forged image having the second label, a noised-added real image having the third label, and a noised-added forged image having the fourth label as training images; inputting a noised-added real image having the first label and a noised-added forged image having the second label into the trained classifier, and calculating gradient information by using a corresponding classification loss function; back propagating the gradient information to train the generator; and using an output of the trained generator as the second-type noise after the generator is trained.

In an embodiment, the associated first noise-added image and the second noise-added image are constructed in the following manner: performing weighted superimposition of (i) a respective original image and (ii) the first-type noise by using a and 1-α as weights, to obtain the first noise-added image; and performing weighted superimposition of (i) the respective original image and (ii) the second-type noise by using β and 1-β as weights, to obtain the second noise-added image. α and β are both random values between 0 and 1.

In step 603, a training set is established based on the original image and the associated first noise-added image and second noise-added image. In step 604, the generative adversarial network is trained based on the training set, to obtain a parameter of the generative adversarial network.

In an embodiment, the training the generative adversarial network based on the training set, to obtain a parameter of the generative adversarial network further includes: inputting the training set into the classifier, and calculating a corresponding first classification loss function, second classification loss function, and third classification loss function; combining the first classification loss function, the second classification loss function, and the third classification loss function, and training the generative adversarial network by using the combined classification loss function, to obtain the parameter of the generative adversarial network.

Figure 7:
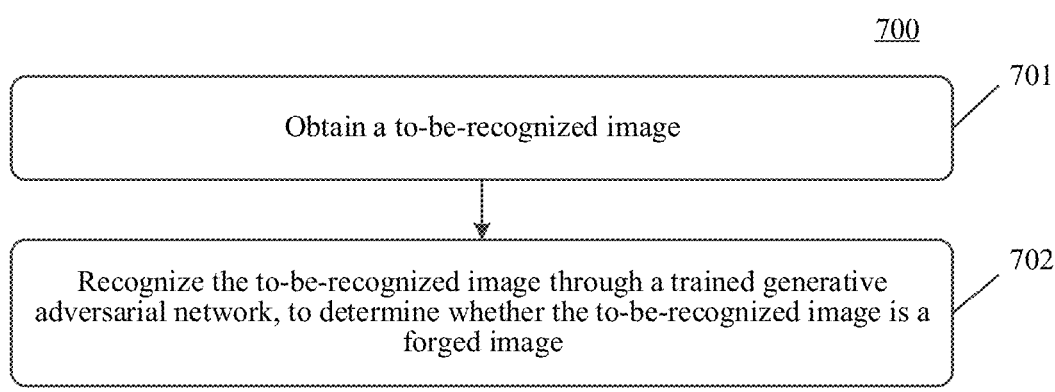
FIG. 7 schematically shows a flowchart of an image recognition method according to an embodiment of this application.

FIG. 7 schematically shows a flowchart of an image recognition method 700 according to an embodiment of this application. The image recognition method may be performed in a user-side or server-side computing device. In step 701, a to-be-recognized image is obtained. The obtained image may be a single image, or may be an image with a face selected from a video or live stream by using a predetermined algorithm. The predetermined algorithm may be, for example, selecting a key frame by using a frame spacing, or selecting a picture with a face by using a trained network that determines whether a face exists. In step 702, the image is recognized through a trained generative adversarial network, to determine whether the image is a forged image.

In an embodiment, this embodiment of this application may present a recognition result of whether the to-be-recognized image is a forged image. For example, the recognition result may be presented or outputted through a user interface. For example, in a case that for an input that is a real face image, the output is "real"; and for an input that is a forged face image, the output is "forged". For a user interface that is presented in the form of an API, "0" may be outputted to indicate a real face image, and "1" may be outputted to indicate a forged face image.

The generative adversarial network includes a generator and a classifier, where the generator may be of an encoder-decoder structure, and the classifier is of a structure such as a DNN, a CNN, and the like. As understood by a person skilled in the art, the structures of the generator and the classifier are not limited to the foregoing examples, but may also include any other common neural network structure suitable for the method. The method for training a generative adversarial network may be performed by a user terminal-side computing device or a server-side computing device.

In the image recognition method, first-type noise and second-type noise are constructed, and a training set is constructed by superimposing the original image, the first-type noise, and the second-type noise, to train the generative adversarial network, thereby improving the accuracy and the recall rate of the generative adversarial network, and reducing the risk of overfitting of the generative adversarial network due to a limited training dataset. Adversarial training is performed on the generative adversarial network by using the first-type noise and the second-type noise, so that the classifier included in the generative adversarial network can better learn useful features in the original image. In this way, authenticity of a face in a video and image may be efficiently and quickly detected and analyzed, to determine whether a fake face generated through face swapping exists in the video and the image.

Figure 8:
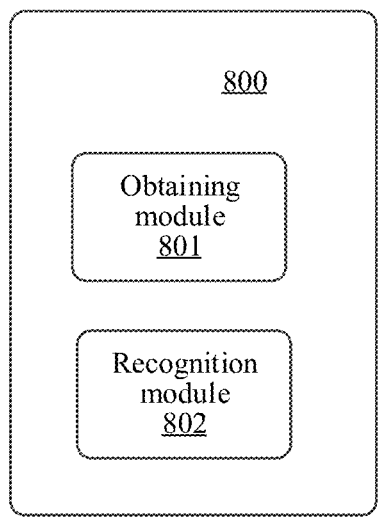
FIG. 8 schematically shows a schematic block diagram of an image recognition apparatus according to an embodiment of this application.

FIG. 8 schematically shows an image recognition apparatus 800 according to an embodiment of this application. The apparatus 800 further includes an obtaining module 801 and a recognition module 802. The obtaining module 801 is configured to obtain a to-be-recognized image; and the recognition module 802 is configured to recognize the image through a trained generative adversarial network, to determine whether the image is a forged image. The generative adversarial network includes a generator and a classifier, and the generative adversarial network may be trained by performing the following steps: obtaining an original image group including a plurality of original images and a category label of each original image, each of the plurality of original images including a real image and a forged image corresponding the real image; obtaining, for each original image, first-type noise corresponding to the respective original image by using a classifier to construct an associated first noise-added image, and obtaining second-type noise corresponding to the respective original image by using a generative adversarial network to construct a second noise-added image; establishing a training set based on the original image and the associated first noise-added image and second noise-added image; and training the generative adversarial network based on the training set, to obtain a parameter of the generative adversarial network.

The image recognition method constructs first-type noise and second-type noise, and constructs a training set by superimposing the original image, the first-type noise, and the second-type noise, to train the generative adversarial network, thereby improving the accuracy and the recall rate of the generative adversarial network, and reducing the risk of overfitting of the generative adversarial network due to a limited training dataset. Adversarial training is performed on the generative adversarial network by using the first-type noise and the second-type noise, so that the classifier included in the generative adversarial network can better learn useful features in the original image. In this way, authenticity of a face in a video and image may be efficiently and quickly detected and analyzed, to determine whether a fake face generated through face swapping exists in the video and the image.

Figure 9:
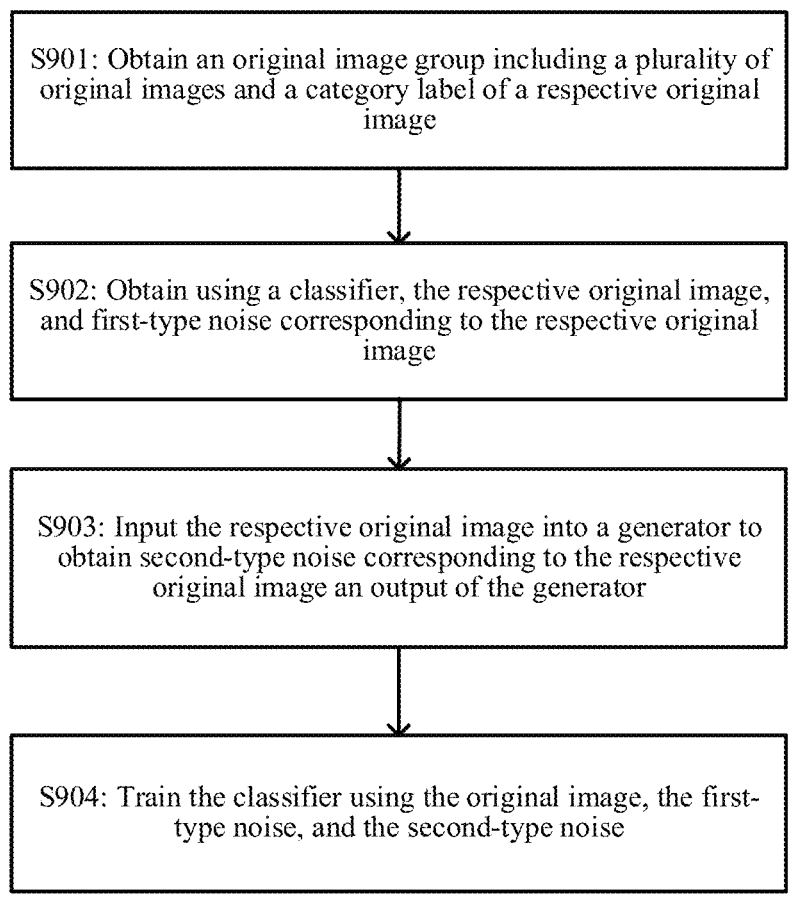
FIG. 9 is a flowchart of a classifier training method 900 according to an embodiment of this application.

In some embodiments, a manner of training the classifier is shown in FIG. 9. FIG. 9 is a flowchart of a classifier training method 900 according to an embodiment of this application.

As shown in FIG. 9, in step S901, an original image group including a plurality of original images and a category label of each original image are obtained. The respective original image of the plurality of original images includes a real image and a forged image corresponding the real image. For example, a category label of the real image in the original image group is a first label. A category label of the forged image is a second label. The forged image corresponding to the real image is, for example, a forged image obtained by performing face swapping on the real image.

In step S902, first-type noise corresponding to the respective original image is obtained for each original image by using the classifier.

In step S903, the respective original image is inputted into the generator to obtain an output of the generator, and the output is used as second-type noise corresponding to the respective original image.

In step S904, the classifier is trained by using the original image, the first-type noise, and the second-type noise. The trained classifier may be configured to perform image recognition, that is, determine whether an inputted image is a forged image.

During training of the generative adversarial network, the generative adversarial network may be sensitive to part of information in training data (that is, the original image). In view of this, in this embodiment of this application, training may be performed by using the first-type noise, thereby resolving the problem of model overfitting. In addition, in this embodiment of this application, discriminative information related to the category label in the training data may be represented by the second-type noise. Therefore, the classifier is trained by using the second-type noise, so that in this embodiment of this application, the trained classifier may continuously focus on the discriminative information, and the classifier may better learn useful features, thereby improving the recall rate and the accuracy of the classifier.

Based on the above, since the generative adversarial network is trained by using the first-type noise and the second-type noise, the diversity of the adversarial noise is fully considered in this embodiment of this application, so that the accuracy and the recall rate of image recognition may be improved, and the problem of model overfitting may be resolved. In this way, according to the image recognition method provided in this embodiment of this application, authenticity of a face in a video and image may be efficiently and accurately detected and analyzed, to determine whether a fake face generated through face swapping exists in the video and the image.

In some embodiments, in step S902, the category label of the respective original image may be first inverted, to obtain an inverted label of the respective original image. For example, in step S902, a category label of the real image in the original image is inverted from a first label to a second label, to obtain an inverted label of the real image. In step S902, a category label of the forged image in the original image is inverted from the second label to the first label, to obtain an inverted label of the forged image. Then, in step S902, each original image including an inverted label into may be inputted the classifier to obtain a classification loss function, and gradient information is determined by using a classification loss function. Based on this, in step S902, the gradient information is back propagated to the respective original image, to obtain the first-type noise corresponding to the respective original image.

In some embodiments, step S904 may be implemented as a method 1000.

Figure 10:
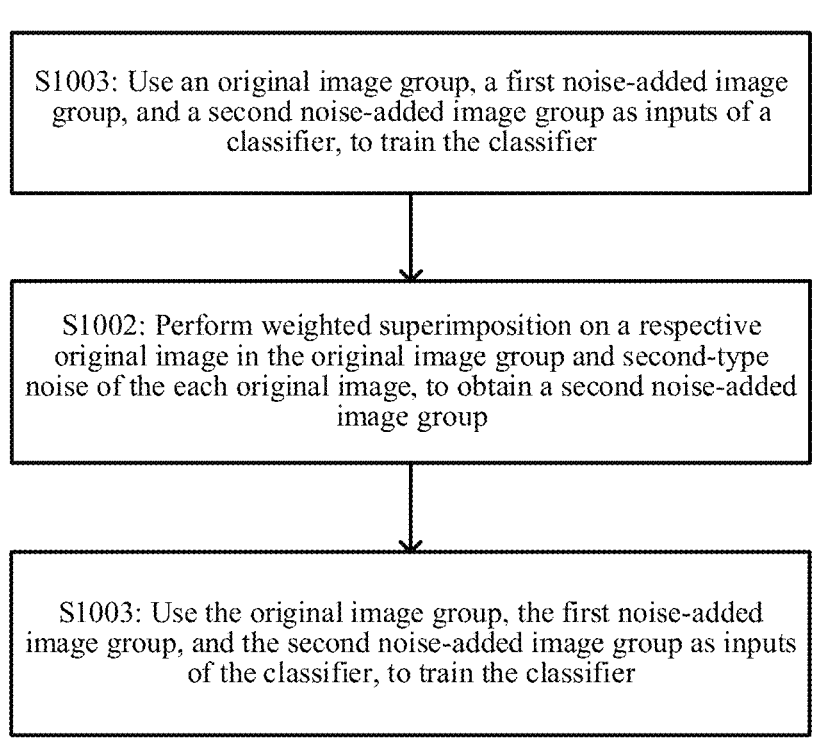
FIG. 10 is a flowchart of a classifier training method 1000 according to an embodiment of this application.

As shown in FIG. 10, in step S1001, weighted superimposition is performed on (i) a respective original image in the original image group and (ii) the first-type noise of the respective original image, to obtain a first noise-added image group.

In step S1002, weighted superimposition is performed on a respective original image in the original image group and the second-type noise of the respective original image, to obtain a second noise-added image group.

In step S1003, the original image group, the first noise-added image group, and the second noise-added image group are used as inputs of the classifier, to train the classifier.

Based on the above, in the method 1000, the diversity of the adversarial noise may be fully considered based on limited original training samples (that is, the original image group), and the first noise-added image group related to the first-type noise and the second noise-added image group related to the second-type noise are generated. In this way, the method 1000 extends the scale of the training samples and enables the training sample to carry the adversarial noise. Based on this, in the method 1000, the classifier is trained by using the original image group, the first noise-added image group, and the second noise-added image group, thereby avoiding model overfitting and improving the accuracy and the recall rate of image recognition.

In some embodiments, to obtain the first noise-added image group, in step S1001, weighted superimposition of (i) the respective original image in the original image group and (ii) the first-type noise of the respective original image by using $\alpha$ and $1-\alpha$ as weights may be performed, to obtain the first noise-added image group, $\alpha$ being a random value between 0 and 1.

In addition, to obtain the second noise-added image group, in step S1002, weighted superimposition of (i) the respective original image in the original image group and (ii) the second-type noise of the respective original image by using $\beta$ and $1-\beta$ as weights may be performed, to obtain the second noise-added image group, $\beta$ being a random value between 0 and 1.

In some embodiments, step S1003 may be implemented as a method 1100 to train the classifier.

Figure 11:
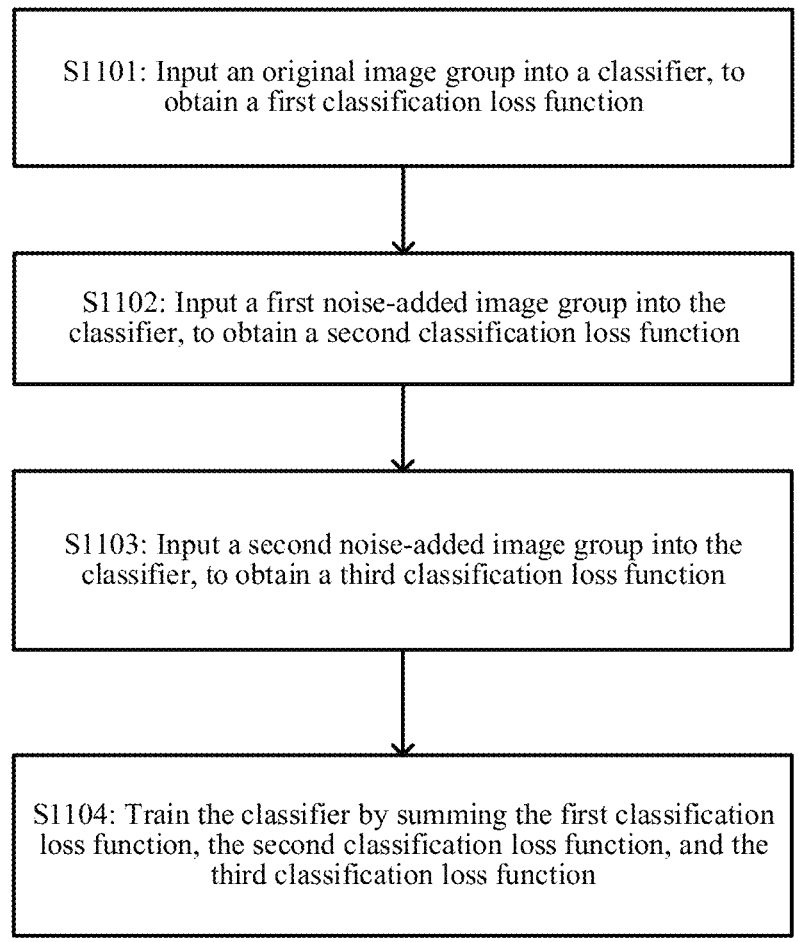
FIG. 11 is a flowchart of a classifier training method 1100 according to an embodiment of this application.

As shown in FIG. 11, in step S1101, the original image group is inputted into the classifier, to obtain a first classification loss function.

In step S1102, the first noise-added image group is inputted into the classifier, to obtain a second classification loss function.

In step S1103, the second noise-added image group is inputted into the classifier, to obtain a third classification loss function.

In step S1104, the classifier is trained by using a sum of the first classification loss function, the second classification loss function, and the third classification loss function.

The classification loss function is used for representing an error of the classifier. In the method 1100, the classifier may be trained with reference to the first, second, and third classification loss functions, so that a parameter of the classifier may be optimized by fully using a plurality of types of adversarial noise, thereby improving the accuracy and the recall rate of the classifier.

Figure 12:
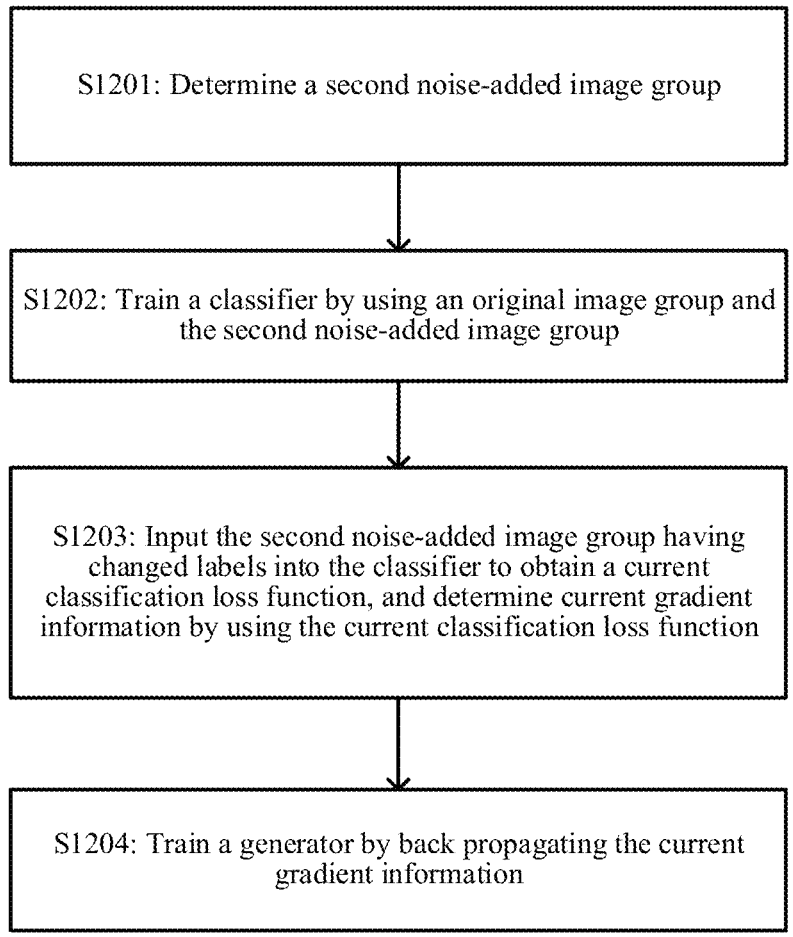
FIG. 12 is a flowchart of a generator training method 1200 according to an embodiment of this application.

In addition, since the second-type noise is required for training of the classifier, in this embodiment of this application, interference (confrontation) capability of the second-type noise may be improved by training the generator, to improve recognition capability of the classifier. For example, FIG. 12 shows a flowchart of a generator training method 1200. As shown in FIG. 12, in step S1201, a second noise-added image group is determined. The second noise-added image group including a noised-added real image having a third label and a noised-added forged image having a fourth label, the noised-added real image is obtained by performing weighted superimposition on the real image and second-type noise of the real image, and the noised-added forged image is obtained by performing weighted superimposition on the forged image and second-type noise of the forged image.

In step S1202, the classifier is trained by using the original image group and the second noise-added image group. The generator and the classifier of the generative adversarial network needs to be improved during confrontation. In view of this, before the generator is trained, in a method 1200, the classifier is trained first by using the original image group and the second noise-added image group, to improve the recognition capability of the classifier, that is, reduce the classification loss function.

In step S1203, the second noise-added image group having changed labels is inputted into the classifier to obtain a current classification loss function, and current gradient information is determined by using the current classification loss function. The second noise-added image group having changed labels includes the noised-added real image having a first label and the noised-added forged image having a second label.

In step S1204, the generator is trained by back propagating the current gradient information.

Based on the above, in the method 1200, the recognition capability of the classifier may be improved, and the generator is trained by using the second noise-added image group having changed labels, so that performance of the generator can be improved, thereby improving performance of the classifier during subsequent training of the classifier.

Figure 13:
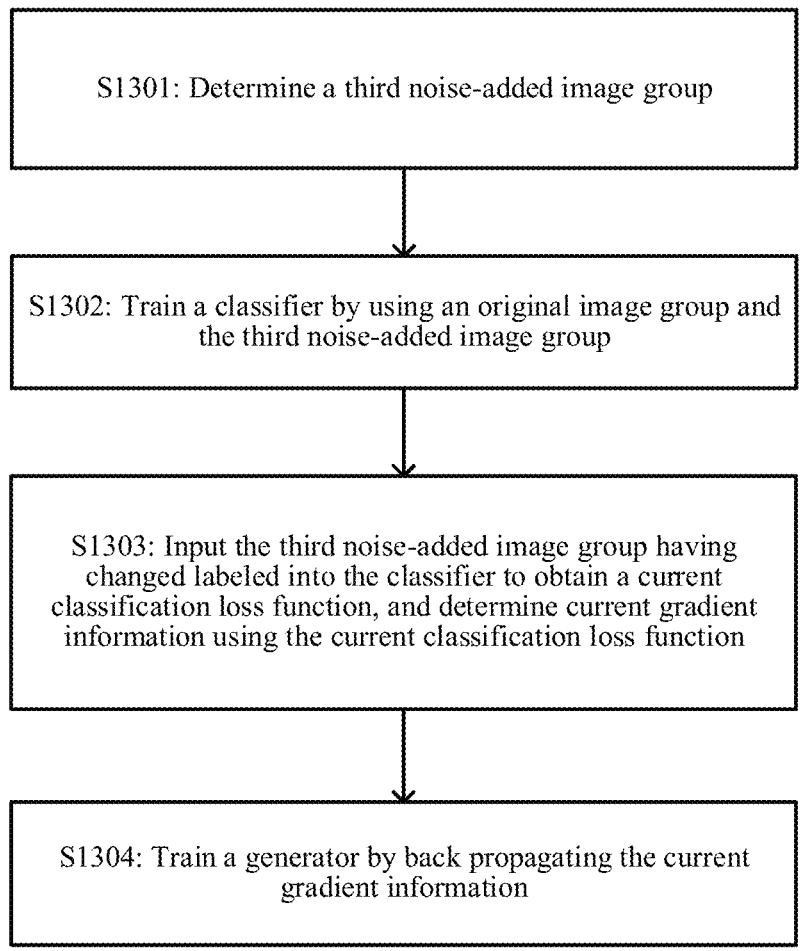
FIG. 13 is a flowchart of a generator training method 1300 according to an embodiment of this application.

In some embodiments, the generator training method may further be implemented as a method 1300 shown in FIG. 13.

As shown in FIG. 13, in step S1301, a third noise-added image group is determined. The third noise-added image group includes the noised-added real image having a third label and the noised-added forged image having a fourth label. The noised-added real image of the third noise-added image group is obtained by performing weighted superimposition on the real image, first-type noise of the real image, and second-type noise of the real image, and the noised-added forged image of the third noise-added image group is obtained by performing weighted superimposition on the forged image, first-type noise of the forged image, and second-type noise of the forged image. In the method 1300, the first-type noise and the second-type noise may be fully considered in the third noise-added image group, thereby improving interference capability of samples (that is, the third noise-added image group) of a to-be-inputted classifier.

In step S1302, the classifier is trained by using the original image group and the third noise-added image group. Since the interference capability of the third noise-added image group is improved in step S1301, in step S1302, the classifier is trained by using the third noise-added image group, so that recognition capability of the classifier may be improved.

In step S1303, the third noise-added image group having changed labels is inputted into the classifier to obtain a current classification loss function, and current gradient information is determined by using the current classification loss function. The third noise-added image group having changed labels includes the noised-added real image having a first label and the noised-added forged image having a second label.

In step S1304, the generator is trained by back propagating the current gradient information.

Based on the above, in the method 1300, interference capability of training samples (that is, the third noise-added image group) may be improved, thereby improving the recognition capability of the classifier. Based on this, in the method 1300, the generator is trained by using the third noise-added image group having changed labels, which can improve the performance of the classifier.

Figure 14:
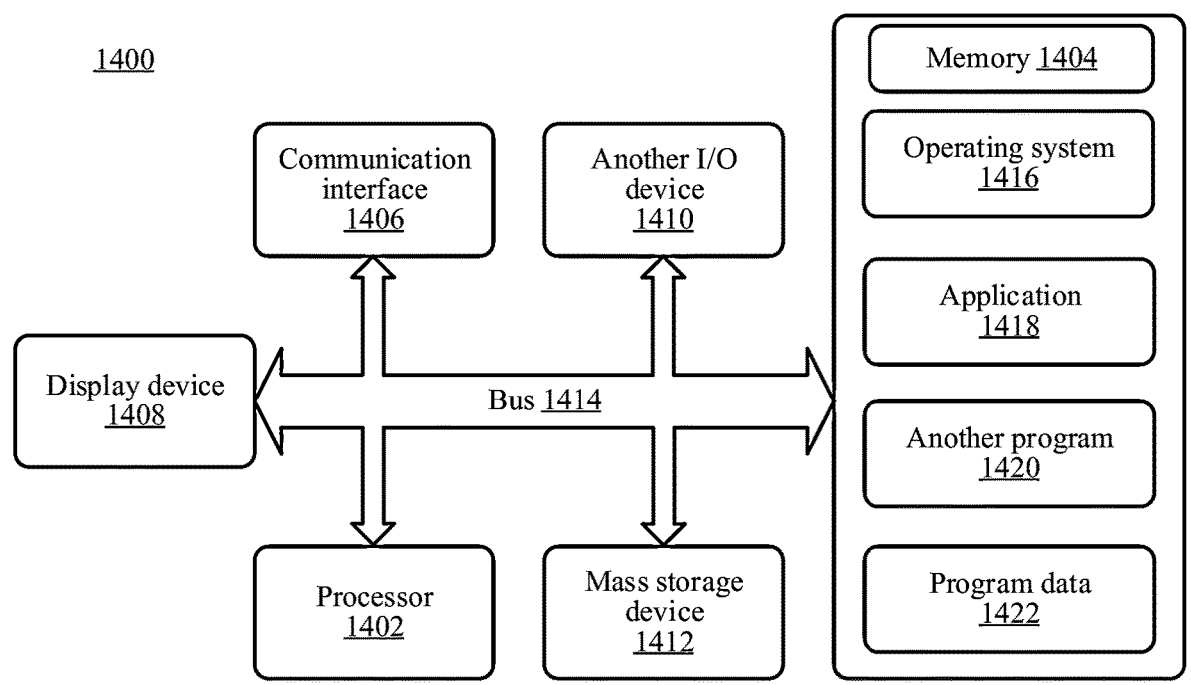
FIG. 14 is a schematic block diagram of a computing system that can implement some embodiments of this application.

FIG. 14 is a schematic block diagram of a computing system 1400 that can implement some embodiments of this application. In some embodiments, the computing system 1400 represents a computing device 240 in an application scenario in FIG. 2. The computing system 1400 may perform the image recognition method, the classifier training method, and the generator training method.

The computing system 1400 may include a variety of different types of devices such as a computing device, a computer, a client device, a system on a chip, and/or any other suitable computing device or computing system.

The computing system 1400 may include at least one processor 1402, a memory 1404, a (plurality of) communication interface(s) 1406, a display device 1408, another input/output (I/O) device 1410, and one or more mass storage devices 1412 capable of communicating with each other through a system bus 1414 or in another appropriate manner.

The processor 1402 may be a single processing unit or a plurality of processing units, all of the processing units may include a single or a plurality of computing units or a plurality of cores. The processor 1402 may be implemented as one or more microprocessors, a microcomputer, a microcontroller, a digital signal processor, a central processing unit, a state machine, a logic circuit, and/or any device that manipulates signals based on operational instructions. In addition to other capabilities, the processor 1402 may be configured to obtain and execute computer-readable instructions stored in the memory 1404, the mass storage device 1412, or another computer-readable medium, such as program code of an operating system 1416, program code of an application 1418, or program code for another program 1420, to implement the method for training a neural network for image recognition provided in this embodiment of this application.

The memory 1404 and the mass storage device 1412 are examples of computer storage media for storing instructions, and the instructions is executed by the processor 1402 to implement the various functions described above. For example, the memory 1404 generally include both a volatile memory and a non-volatile memory (e.g., a RAM, a ROM, and the like). In addition, the mass storage device 1412 may generally include a hard drive, a solid state drive, a removable medium, an external and removable drive, a memory card, a flash memory, a floppy disk, an optical disk (e.g., a CD or a DVD), a storage array, a network attached storage, a storage area network, and the like. Both the memory 1404 and the mass storage device 1412 may be collectively referred to herein as memories or computer storage media, and may be non-transitory media capable of storing computer-readable, processor-executable program instructions as computer program code, the computer program code being executed by the processor 1402 as a particular machine to implement the operations and functions described in the examples herein.

A plurality of program modules may be stored on the mass storage device 1412. Such programs include an operating system 1416, one or more applications 1418, another program 1420, and program data 1422, which may be loaded into the memory 1404 for execution. Examples of such applications or program modules may include, for example, computer program logic (for example, computer program code or instructions) for implementing the method for training a neural network for image recognition provided herein. Moreover, such program modules may be distributed in different physical locations to implement corresponding functions. For example, the method described as being performed by the computing device 140 in FIG. 1 may be distributed on a plurality of computing devices for implementation.

This application further provides a computer-readable storage medium, storing computer-readable instructions, the computer-readable instructions, when executed, performing the image recognition method, the classifier training method, and the generator training method.

Although illustrated in FIG. 14 as being stored in the memory 1404 of the computing system 1400, modules 1414, 1418, 1420, and 1422, or parts thereof, may be implemented by any form of computer-readable medium accessible by the computing system 1400. As used herein, the "computer-readable media" includes at least two types of computer-readable media, namely, a computer storage medium and a communication medium.

The computer storage medium includes volatile or nonvolatile media, or removable or non-removable media that are implemented by using any method or technology used to store information such as computer-readable instructions, a data structure, a program module, or other data. The computer storage medium includes, but is not limited to, a RAM, a ROM, an EEPROM, a flash memory or another memory technology, a CD-ROM, a digital versatile disk (DVD) or another optical storage apparatus, a tape cartridge, a tape, a tape storage apparatus or another magnetic storage device, or any other medium that can be used for information for access by the computing system.

Correspondingly, communication medium may specifically implement computer readable instructions, a data structure, a program module or other data in a modulated data signal such as a carrier wave or another transport mechanism. The computer storage medium defined herein does not include the communication medium.

The computing system 1400 may further include one or more communication interfaces 1406 for exchanging data with another device through a network, a direct connection, and the like. The communication interface 1406 may facilitate communication within a variety of networks and protocol types, including a wired network (e.g., a LAN, a cable, and the like) and a wireless network (e.g., a WLAN, cellular, satellite, and the like), the Internet, and the like. The communication interface 1406 may further provide communication with external storage devices (not shown) in the storage array, the network attached storage, the storage area network, and the like.

In some examples, a display device 1408 such as a monitor may be included for displaying information and images. Another I/O device 1410 may be a device that receives various inputs from the user and provides various outputs to the user, and may include a touch input device, a gesture input device, a camera, a keyboard, a remote control, a mouse, a printer, an audio input/output device, and the like.

In the descriptions of this specification, the description of a term such as "an embodiment", "some embodiments", "an example", "a specific example", or "some examples" means that a specific feature, structure, material, or characteristic that is described with reference to the embodiment or the example is included in at least one embodiment or example of this application. In this specification, exemplary descriptions of the foregoing terms are not necessarily directed to the same embodiments or examples. Moreover, the specific features, structures, materials, or characteristics described may be combined in any one or more embodiments or examples in a suitable manner. In addition, a person skilled in the art may integrate or combine different embodiments or examples described in the specification and features of the different embodiments or examples as long as they are not contradictory to each other.

Any process or method description in the flowchart or described in other ways herein can be understood as a module, segment or part of a code that includes one or more executable instructions for implementing customized logic functions or steps of the process, and the scopes of the preferred embodiments of this application include additional implementations, which may not be in the order shown or discussed, including performing functions in a substantially simultaneous manner or in reverse order according to the functions involved. This should be understood by a person skilled in the art to which the embodiments of this application belong.

In addition, each functional unit in each embodiment of this application may be integrated into one processing module, or may exist alone physically, or two or more units may be integrated into one module. The integrated module may be implemented in the form of hardware, or may be implemented in a form of a software functional module. If the integrated module is implemented in the form of a software functional module and sold or used as an independent product, the integrated unit may be stored in a computer-readable storage medium.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

By studying the drawings, the disclosure, and the appended claims, those skilled in the art can understand and implement modifications to the disclosed embodiments when practicing the claimed subject matter. In the claims, the term "comprise" does not exclude other elements or steps, and the indefinite article "a" or "an" does not exclude a plurality. The only fact that some measures are recorded in mutually different dependent claims does not indicate that a combination of these measures cannot be used to advantage.

What is claimed is:

1. A method for image recognition, the method comprising:
obtaining a to-be-recognized image;
determining whether the to-be-recognized image is a forged image by recognizing the to-be-recognized image through a trained generative adversarial network, wherein the trained generative adversarial network comprises a generator and a classifier; and
training the classifier, comprising:
  obtaining an original image group comprising a plurality of original images, and a category label of each original image, each of the plurality of original images comprising a real image and a forged image corresponding to the real image;
  inverting the category label of a respective original image in the plurality of original images, to obtain an inverted label of the respective original image;
  inputting an original image comprising an inverted label into the classifier, to calculate gradient information:
  back propagating the gradient information to the respective original image, to obtain first-type noise corresponding to the respective original image;
  inputting the respective original image into the generator to obtain second-type noise corresponding to the respective original image as an output of the generator; and
  training the classifier using the respective original image, the first-type noise, and the second-type noise.

2. The method according to claim 1, wherein the gradient information is calculated using a classification loss function.

3. The method according to claim 1, wherein inverting the category label of the respective original image comprises:
inverting a category label of the real image in the respective original image from a first label to a second label, to obtain an inverted label of the real image; and
inverting a category label of the forged image in the respective original image from the second label to the first label, to obtain an inverted label of the forged image.

4. The method according to claim 1, wherein training the classifier by using the respective original image, the first-type noise, and the second-type noise comprises:
performing weighted superimposition on (i) the respective original image in the original image group and (ii) the first-type noise of the respective original image, to obtain a first noise-added image group;
performing weighted superimposition on (i) the respective original image in the original image group and (ii) the second-type noise of the respective original image, to obtain a second noise-added image group; and
training the classifier using the original image group, the first noise-added image group, and the second noise-added image group as inputs to the classifier.

5. The method according to claim 4, wherein training the classifier using the original image group, the first noise-added image group, and the second noise-added image group as inputs to the classifier comprises:
obtaining a first classification loss function by inputting the original image group into the classifier;
obtaining a second classification loss function by inputting the first noise-added image group into the classifier;
obtaining a third classification loss function by inputting the second noise-added image group into the classifier; and
training the classifier by summing the first classification loss function, the second classification loss function, and the third classification loss function.

6. The method according to claim 4, wherein
performing the weighted superimposition on the respective original image in the original image group and the first-type noise of the respective original image, to obtain a first noise-added image group comprises: performing weighted superimposition on the respective original image in the original image group and the first-type noise of the respective original image by using $\alpha$ and $1-\alpha$ as weights, to obtain the first noise-added image group, $\alpha$ being a random value between 0 and 1; and
performing weighted superimposition on the respective original image in the original image group and the second-type noise of the respective original image, to obtain a second noise-added image group comprises: performing weighted superimposition on (i) the respective original image in the original image group and (ii) the second-type noise of the respective original image by using $\beta$ and $1-\beta$ as weights, to obtain the second noise-added image group, $\beta$ being a random value between 0 and 1.

7. The method according to claim 1, wherein training the generator comprises:
determining a second noise-added image group comprising a noised-added real image comprising a third label and a noised-added forged image comprising a fourth label, wherein the noised-added real image is obtained by a weighted superimposition of (i) the real image and (ii) second-type noise of the real image, and wherein the noised-added forged image is obtained by a weighted superimposition of (i) the forged image and (ii) second-type noise of the forged image;
training the classifier using the original image group and the second noise-added image group;
obtaining a current classification loss function by inputting the second noise-added image group having changed labels into the classifier, and determining current gradient information using the current classification loss function, wherein the second noise-added image group having changed labels comprises the noised-added real image having a first label and the noised-added forged image having a second label; and
training the generator by back propagating the current gradient information.

8. The method according to claim 1, wherein training the generator comprises: determining a third noise-added image group comprising a noised-added real image having a third label and a noised-added forged image having a fourth label, wherein the noised-added real image of the third noise-added image group is obtained by a weighted superimposition of (i) the real image, (ii) first-type noise of the real image, and (iii) second-type noise of the real image, and wherein the noised-added forged image of the third noise-added image group is obtained by a weighted superimposition of (i) the forged image, (ii) first-type noise of the forged image, and (iii) second-type noise of the forged image;
training the classifier using the original image group and the third noise-added image group;

obtaining a current classification loss function by inputting the third noise-added image group having changed labels into the classifier, and determining current gradient information using the current classification loss function, wherein the third noise-added image group comprises the noised-added real image having a first label and the noised-added forged image having a second label; and training the generator by back propagating the current gradient information.

9. The method according to claim 1, wherein the forged image corresponding to the real image is a forged image obtained by swapping a face in the real image.

10. The method according to claim 1, wherein obtaining a to-be-recognized image comprises:
selecting an image containing a face from a video as the to-be-recognized image.

11. The method according to claim 1, further comprising:
presenting a recognition result indicating whether the to-be-recognized image is a forged image.

12. An electronic device, comprising:
one or more processors; and
memory storing one or more programs, the one or more programs comprising instructions that, when executed by the one or more processors, cause the one or more processors to perform operations comprising:
obtaining a to-be-recognized image;
determining whether the to-be-recognized image is a forged image by recognizing the to-be-recognized image through a trained generative adversarial network, wherein the trained generative adversarial network comprises a generator and a classifier; and
training the classifier, comprising:
obtaining an original image group comprising a plurality of original images, and a category label of each original image, each of the plurality of original images comprising a real image and a forged image corresponding to the real image;
inverting the category label of a respective original image in the plurality of original images, to obtain an inverted label of the respective original image;
inputting an original image comprising an inverted label into the classifier, to calculate gradient information:
back propagating the gradient information to the respective original image, to obtain first-type noise corresponding to the respective original image;
inputting the respective original image into the generator to obtain second-type noise corresponding to the respective original image as an output of the generator; and
training the classifier using the respective original image, the first-type noise, and the second-type noise.

13. The electronic device of claim 12, wherein the gradient information is calculated using a classification loss function.

14. The electronic device of claim 12, wherein inverting the category label of the respective original image comprises:
inverting a category label of the real image in the respective original image from a first label to a second label, to obtain an inverted label of the real image; and
inverting a category label of the forged image in the respective original image from the second label to the first label, to obtain an inverted label of the forged image.

15. The electronic device of claim 12, wherein training the classifier by using the respective original image, the first-type noise, and the second-type noise comprises:
performing weighted superimposition on (i) the respective original image in the original image group and (ii) the first-type noise of the respective original image, to obtain a first noise-added image group;
performing weighted superimposition on (i) the respective original image in the original image group and (ii) the second-type noise of the respective original image, to obtain a second noise-added image group; and
training the classifier using the original image group, the first noise-added image group, and the second noise-added image group as inputs to the classifier.

16. The electronic device of claim 15, wherein training the classifier using the original image group, the first noise-added image group, and the second noise-added image group as inputs to the classifier comprises:
obtaining a first classification loss function by inputting the original image group into the classifier;
obtaining a second classification loss function by inputting the first noise-added image group into the classifier;
obtaining a third classification loss function by inputting the second noise-added image group into the classifier; and
training the classifier by summing the first classification loss function, the second classification loss function, and the third classification loss function.

17. The electronic device of claim 12, wherein training the generator comprises:
determining a second noise-added image group comprising a noised-added real image comprising a third label and a noised-added forged image comprising a fourth label, wherein the noised-added real image is obtained by a weighted superimposition of (i) the real image and (ii) second-type noise of the real image, and wherein the noised-added forged image is obtained by a weighted superimposition of (i) the forged image and (ii) second-type noise of the forged image;
training the classifier using the original image group and the second noise-added image group;
obtaining a current classification loss function by inputting the second noise-added image group having changed labels into the classifier, and determining current gradient information using the current classification loss function, wherein the second noise-added image group having changed labels comprises the noised-added real image having a first label and the noised-added forged image having a second label; and
training the generator by back propagating the current gradient information.

18. A non-transitory computer-readable storage medium, storing a computer program, the computer program, when executed by one or more processors of an electronic device, cause the one or more processors to perform operations comprising:
one or more processors; and
memory storing one or more programs, the one or more programs comprising instructions that, when executed by the one or more processors, cause the one or more processors to perform operations comprising:
obtaining a to-be-recognized image;
determining whether the to-be-recognized image is a forged image by recognizing the to-be-recognized image through a trained generative adversarial network, wherein the trained generative adversarial network comprises a generator and a classifier; and training the classifier, comprising:
  obtaining an original image group comprising a plurality of original images, and a category label of each original image, each of the plurality of original images comprising a real image and a forged image corresponding to the real image;
  inverting the category label of a respective original image in the plurality of original images, to obtain an inverted label of the respective original image;
  inputting an original image comprising an inverted label into the classifier, to calculate gradient information;
  back propagating the gradient information to the respective original image, to obtain first-type noise corresponding to the respective original image;
  inputting the respective original image into the generator to obtain second-type noise corresponding to the respective original image as an output of the generator; and
  training the classifier using the respective original image, the first-type noise, and the second-type noise.

19. The non-transitory computer-readable storage medium of claim 18, wherein the gradient information is calculated using a classification loss function.

20. The non-transitory computer-readable storage medium of claim 18, wherein inverting the category label of the respective original image comprises:
  inverting a category label of the real image in the respective original image from a first label to a second label, to obtain an inverted label of the real image; and
  inverting a category label of the forged image in the respective original image from the second label to the first label, to obtain an inverted label of the forged image.

* * * * *